United States Patent [19]

Kodama et al.

[11] Patent Number: 4,495,407
[45] Date of Patent: Jan. 22, 1985

[54] SYSTEM FOR FOCUSING AN OPTICAL HEAD ONTO A FLAT SURFACE

[75] Inventors: Hiroshi Kodama; Masaharu Sakamoto; Ken Ohshima; Shoji Yoshikawa; Kunio Yamamiya; Kiichi Kato, all of Tokyo, Japan

[73] Assignee: Olympus Optical Co., Ltd., Tokyo, Japan

[21] Appl. No.: 362,613

[22] Filed: Mar. 29, 1982

[30] Foreign Application Priority Data

Mar. 31, 1981 [JP] Japan .................................. 56-48005

[51] Int. Cl.³ ................................................ G01J 1/20
[52] U.S. Cl. ...................................... 250/201; 369/45
[58] Field of Search ................... 250/201, 204; 369/45; 350/518, 521, 524, 530, 255; 354/25 R; 356/123

[56] References Cited

U.S. PATENT DOCUMENTS

| 4,329,578 | 5/1982 | Rosner | 354/25 |
| 4,370,038 | 1/1983 | Kimura | 250/201 |
| 4,374,324 | 2/1983 | Van Rosmalen et al. | 369/45 |
| 4,416,513 | 11/1983 | Uesugi | 350/255 |

Primary Examiner—David C. Nelms
Assistant Examiner—Ernest Austin, II
Attorney, Agent, or Firm—Frishauf, Holtz, Goodman and Woodward

[57] ABSTRACT

A system for focusing an optical head onto a flat surface has a mechanism for moving the optical head in the direction of the optical axis of the head and a mechanism for moving an objective lens in the optical head in the direction of the optical axis of the lens. A laser beam projected from the objective lens of the optical head is reflected on the flat surface, is reflected on the beam splitter, and is introduced into a detector unit. The detector unit thus generates a focusing signal having a level responsive to the distance between the objective lens and the surface. The optical head is lowered by the mechanism for moving the optical head in accordance with the focusing signal when it passes a predetermined point, and is operated to locate the focal point of the objective lens on the surface. Thereafter, the mechanism for moving the optical head becomes inoperative, and the mechanism for moving the objective lens is operated. This mechanism operates in accordance with the focusing signal and locates the focal point of the objective lens always on the surface.

9 Claims, 22 Drawing Figures

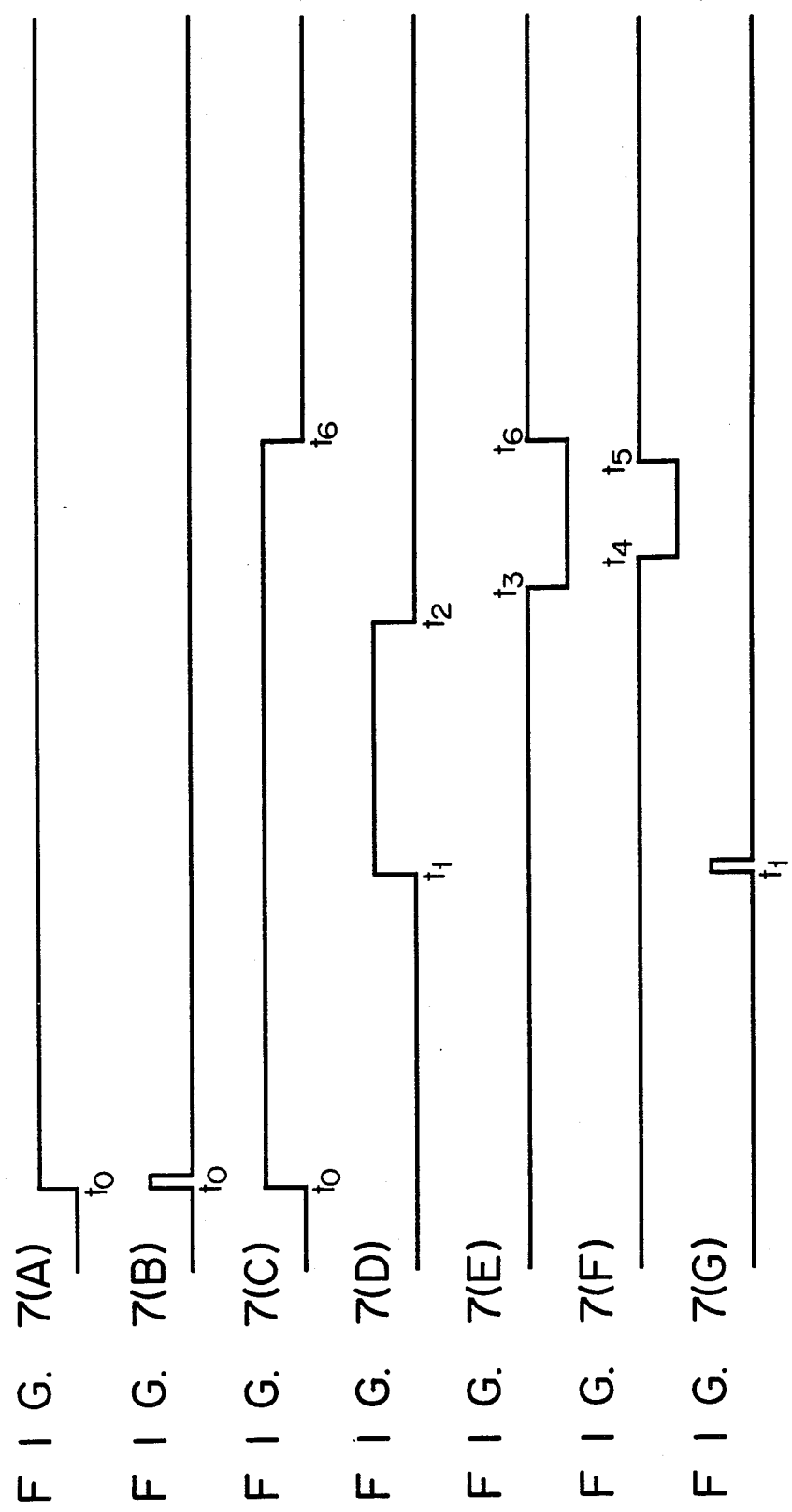

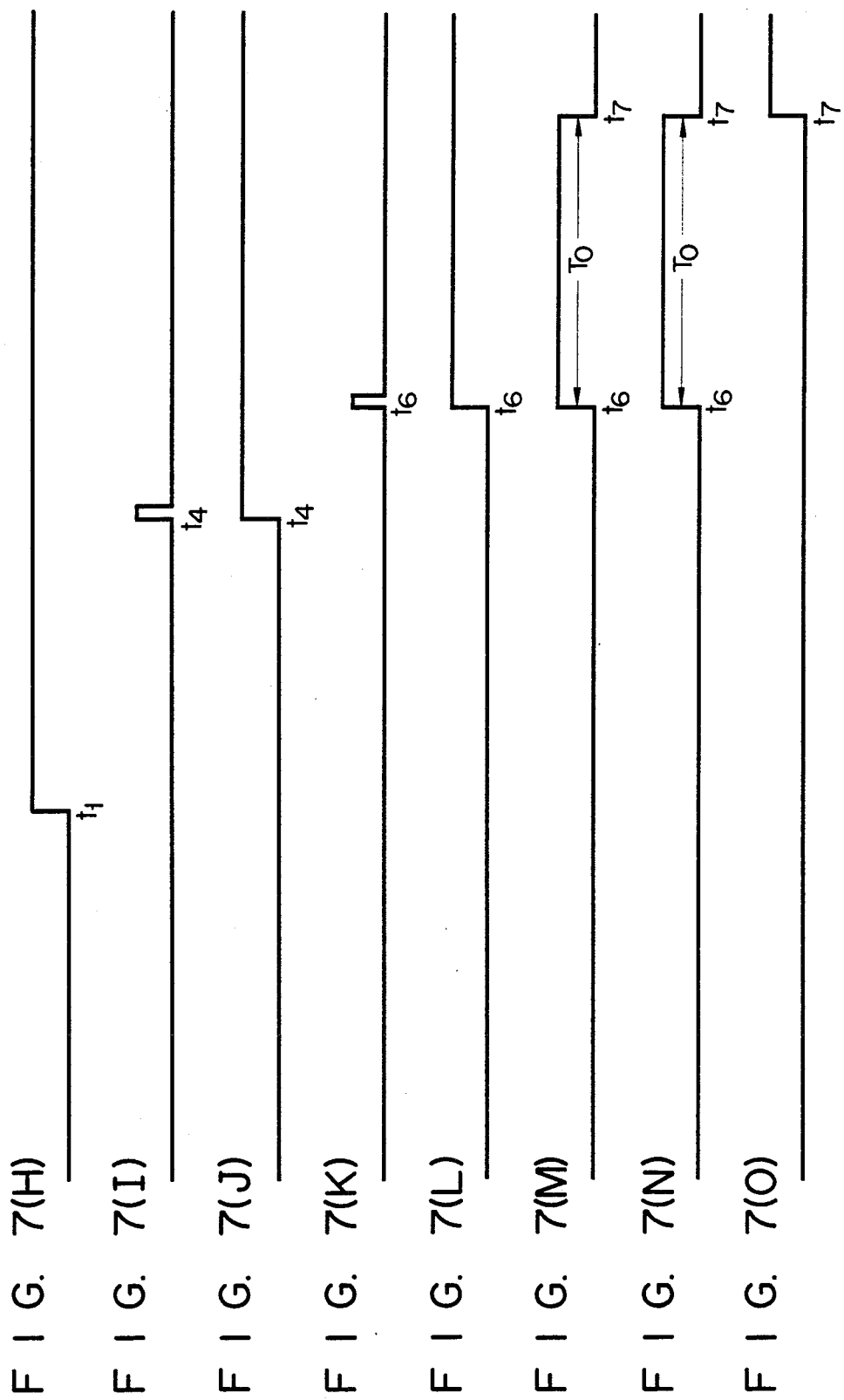

SYSTEM FOR FOCUSING AN OPTICAL HEAD ONTO A FLAT SURFACE

BACKGROUND OF THE INVENTION

The present invention relates to a system for driving an optical head for projecting a laser beam on a flat surface of an object such as, a glass original plate for an optical video disk, an IC wafer or the like and focusing the optical head onto the optical flat surface of the object.

An optical head is applied to a system for inspecting a defect occurred on an optical surface as shown in FIG. 1. This inspecting system comprises a head support 2 moved in an X-axis direction, a laser unit 4 provided in the head support 2, a polarizing beam splitter 6, a quarter-wave plate 8, a mirror 10, a photoelectric conversion detector 12, and an objective lens 16 of an optical head 14, and so forth. An object, e.g., a glass original plate 22 for a video disk is placed on a stage 20 moved in a Y-axis direction on a stage base 18. In such a system, a laser beam is emitted from the laser unit 4, and is focused through the polarizing beam splitter 6, the quarter-wave plate 8, the mirror 10 and the objective lens 16 on the surface 24 to the glass original plate 22. The reflected laser beam thus reflected from the surface 24 to be inspected is again introduced through the objective lens 16, the mirror 10, the quarter-wave plate 8 and the polarizing beam splitter 6 to the detector 12, which thus inspects a defect such as, a scratch, dust, or the like on the surface 24 from the intensity of the reflected laser beam. Accordingly it is required so as to adequately introduce the reflected laser beam to the optical head 14 that the focal point of the objective lens 16 must be accurately located on the surface 24. The conventional objective lens 16 has a fixed focal length, and hence the surface of the glass original plate 22 having various thickness, or of the IC wafer having a thickness thinner than the glass original plate 22 is feasibly displaced from the infinitesimal depth of focus of the objective lens 16 (for example, in case that the diameter of the spot of the laser beam is less than 2 $\mu$m, the depth of the focus is 1 to 2 $\mu$m), the consecutive inspection cannot be heretofore performed disadvantageously. It is considered in order to eliminate such disadvantage that the objective lens 16 is moved along the optical path of the laser beam to focus the objective lens onto the surface, but the optical axis of the objective lens 16 may be inclined during the movement of the objective lens, and the laser beam might not be projected along the optical axis.

SUMMARY OF THE INVENTION

It is an object of the present invention to provide a system for driving an optical head for projecting a laser beam on the optical flat surface of an object with various thickness and accurately focusing the optical head onto the surface of the object.

According to the present invention, there is provided a system which comprises a mechanism for moving the optical head having an objective lens for projecting a laser beam onto the surface of an object along the optical axis of the objective lens, and a mechanism for moving the objective lens along the optical axis of the objective lens. The laser beam reflected from the surface of the object is split by an optical splitter of the optical head, and is introduced into a photo detecting unit. In the photo detecting unit, the laser beam thus introduced is detected to generate a focusing error signal corresponding to a distance between the objective lens and the surface of the object. The mechanism for moving the optical head and the mechanism for moving the objective lens are actuated by this focusing error signal from the photo detecting unit. The objective lens can be accurately located at its focus on the surface of the object by these two mechanisms.

BRIEF DESCRIPTION OF THE DRAWINGS

FIGS. 7(A) through 7(O) are waveform diagrams of the signals produced from the circuit components shown in FIG. 6.

DETAILED DESCRIPTION OF THE PREFERRED EMBODIMENTS

The present invention will be described in more detail with reference to the accompanying drawings.

Figure 1:
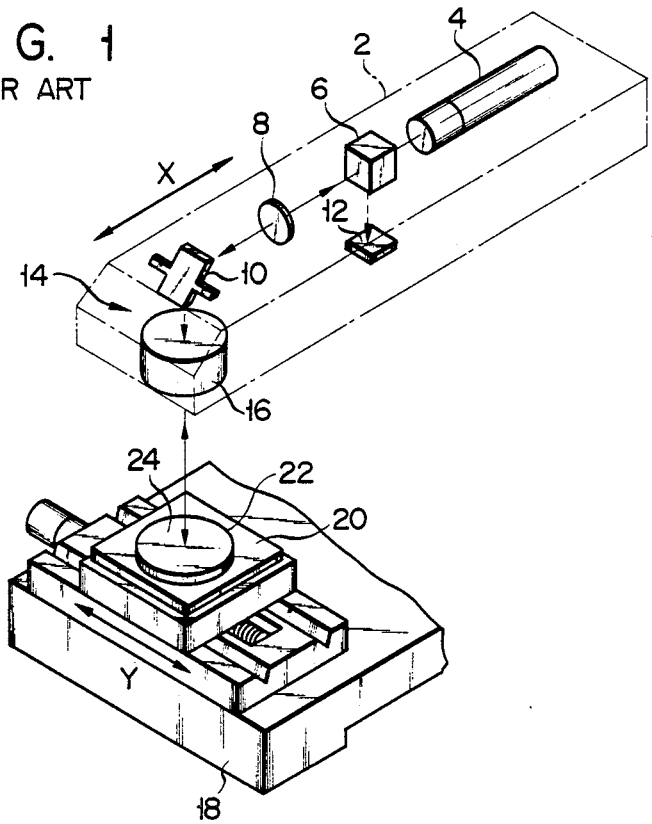
FIG. 1 is a perspective view schematically showing a conventional system for driving an optical head to focus the optical head to an optical flat surface.
Figure 2:
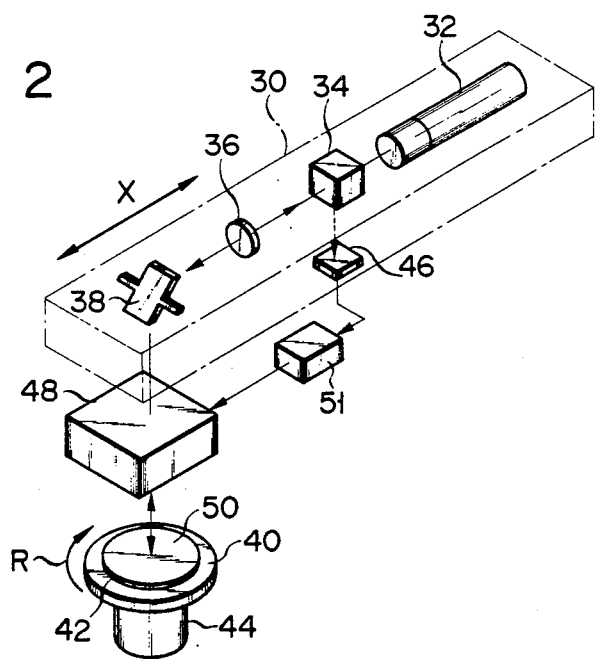
FIG. 2 is a perspective view schematically showing a system for driving an optical head to focus the optical head to an optical flat surface according to one preferred embodiment of the present invention.

FIG. 2 schematically shows a part of the system for inspecting a defect produced on the surface of a glass original surface for an optical video disk applied to a system for driving an optical head according to the present invention. This inspecting system comprises a head support 30 moved in an X-axis direction, and also comprises in the head support 30 a laser unit 32, e.g., an He-Ne laser or the like, a polarizing beam splitter 34, a quarter-wave plate 36 and a mirror 38. In the head support 30 is provided an optical head drive unit 48. A turntable 40 is located under the optical head drive unit 48 and hence under the head support 30, and an object 42 to be inspected, e.g., a glass original plate for a video disk, an IC wafer or the like having a surface 50 to be inspected is placed on the turntable 40. The turntable 40 is connected to a motor 44, which is in turn rotated by the motor 44 at a prescribed speed in an R direction. A detector unit 46 is provided on the optical path of the reflected laser beam introduced from the polarizing beam splitter 34, and serves to generate a detection signal on the basis of the intensity of the reflected laser beam. To the detector unit 46 is connected a focusing signal generating unit 51 which processes the detection signal and thus actuates an optical head drive unit 48. The detection signal from the detector unit 46 is supplied not only to the focusing signal generating unit 51 but also to a defect discriminating circuit (not shown).

Figure 3:
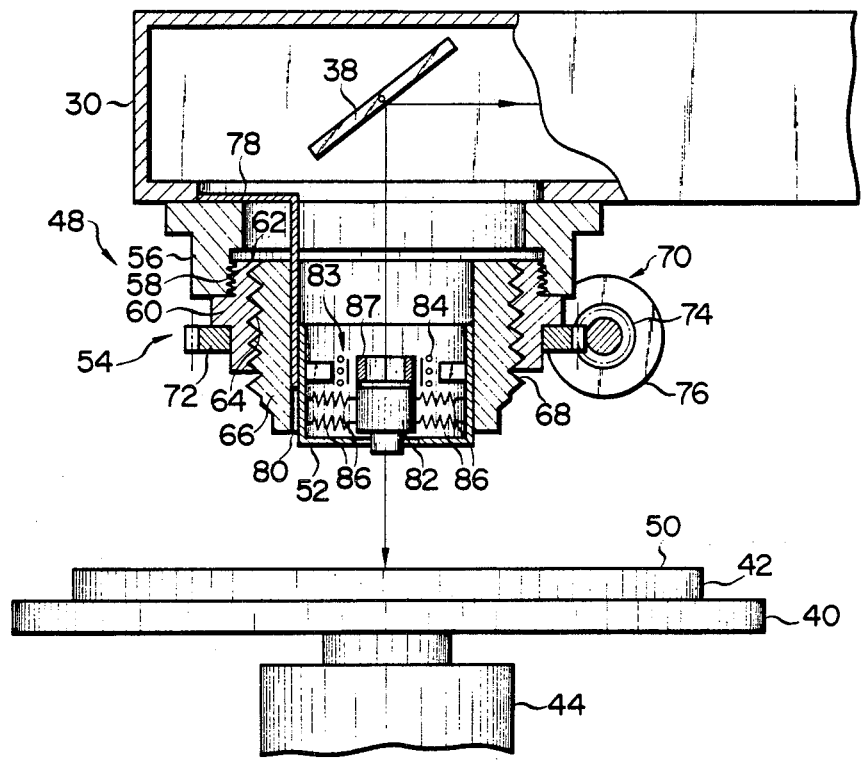
FIG. 3 is a sectional view showing the detail of one example of the optical head drive unit shown in FIG. 2.

The optical head drive unit 48 is constructed as shown in FIG. 3. That is, an optical head 52 provided in the unit 48 is mounted through an optical head drive mechanism 54 on the head support 30, and is located on the optical path of the laser beam reflected from the mirror 38 in the optical head drive mechanism 54. More particularly, the optical head drive mechanism 54 has an outer cylinder 56, which is mounted on the lower end of the head support 30. Female threads 58 are formed on the inner surface of the outer cylinder 56, and are, for example, formed of a single-threaded screw having 0.75 of a lead and 0.75 of a pitch. A middle cylinder 60 is engaged within the inside of the outer cylinder 56. That is, on the outer surface of the middle cylinder 60 are formed male threads 62 engaged with the female threads 58, and accordingly, the middle cylinder 60 is engaged and mounted at the outer cylinder 56. Further, female threads 64 are formed on the inner surface of the middle cylinder 60, and are formed of a fourteenth thread screw having, for example, 21 of a lead and 1.5 of a pitch. An inner cylinder 66 is further engaged within the inside of the middle cylinder 60. More particularly, a male threads 68 are formed in engagement with the female threads 64 on the outer surface of the inner cylinder 66, and accordingly the inner cylinder 66 is engaged and mounted at the middle cylinder 60. Then, the optical head 52 is engaged and mounted in the inner cylinder 66 in such a manner that the optical path of the laser beam passes therein. Further, a drive unit 70 is provided in the middle cylinder 60. The drive unit 70 has a worm wheel 72 mounted on the outer surface of the middle cylinder 60, and worm wheel 72 is rotatably connected integrally with the middle cylinder 60. The worm wheel 72 is engaged with a worm 74, which is connected to a focus motor 76 and which is rotatably driven by the motor 76. A stopper 78 for stopping the rotation of the inner cylinder 60 is fixedly secured at the upper end side thereof to the outer cylinder 56 and is engaged at the lower end side thereof with a guide slot 80 formed along the axial direction of the inner cylinder on the inner surface of the inner cylinder 66. Accordingly, since the inner cylinder 66 is stopped rotating, when the worm 74 is rotated by the focus motor 76 to rotate via the worm wheel 72 the middle cylinder 60, by the stopper 78 in the optical head drive mechanism 54, the inner cylinder 66 and hence the optical head 52 is moved along the optical path of the laser beam and hence the optical axis of the objective lens while the optical axis of the objective lens is retained as it is. Further, the focus motor 76 is actuated by the focusing signal from the focusing signal generating unit 51 as will be hereinafter described in detail. The optical head 52 has an objective lens 82 therein for converging the laser beam to the surface 50 of the object. In addition, in the optical head 52 is provided an objective lens drive mechanism 83, which comprises springs 86, and the objective lens 82 is supported on the optical path of the laser beam via the springs 86. Above the objective lens 82 are arranged a voice coil 84 and a permanent magnet 87. The objective lens 82 is moved along the direction of the optical axis and hence the optical path of the laser beam by the voice coil 84 and the permanent magnet 87. The objective lens drive mechanism 83 is actuated by the focusing signal in the same manner as the focus motor 76.

The operation of the system for inspecting a defect occurring on the optical surface of the object as described above will now be described in detail.

Before the object 42 is placed on the turntable 40, the focus motor 76 of the optical head drive mechanism 54 is energized and rotated, and the optical head 52 is thus moved to the highest position and is then maintained in the stand-by state. The object 42 is placed on the turntable 40 in this state. Subsequently, the laser unit 32 is energized to emit a linearly polarized laser beam. The laser beam is introduced through the polarizing beam splitter 34, the quarter-wave plate 36 and the mirror 38 to the objective lens 82, and is projected from the objective lens 82 to the surface 50 to be inspected of the object 42. The laser beam reflected from the surface 50 is again introduced through the objective lens 82, the mirror 38 and the quarter-wave plate 36 to the polarizing beam splitter 34. When the laser beam is passed through the quarter-wave plate 36 in twice, the laser beam is rotated at its polarizing direction at 90°. Accordingly, the reflected laser beam is reflected in the polarizing beam splitter 34 and is directed to the detector unit 46. Then, the detector unit 46 will generate a detection signal having a level corresponding to the intensity of the reflected laser beam. This detection signal from the detector unit 46 is supplied to the focusing signal generating unit 51, from which a focusing signal or an actuating signal corresponding to the distance between the surface 50 and the objective lens 82 is generated. This focusing signal is supplied to the focus motor 76 of the optical head drive mechanism 54 to drive the focus motor 76. Thus, the focus motor 76 is rotated by the focusing signal to rotate the middle cylinder 60 through the worm 74 and the worm wheel 72. The inner cylinder 66 is moved to the surface 50 along the optical path of the laser beam by the rotation of the middle cylinder 60 with the result that the distance between the objective lens 82 and the surface 50 of the object approaches to the focal length of the objective lens 82. The focus motor 76 is stopped rotating after the distance between the objective lens 82 and the surface 50 of the object is moved similarly to the focal length of the objective lens 82. After the focus motor 76 is stopped, the focusing signal is fed to the objective lens drive mechanism 83. Thus, the objective lens 82 is moved in the direction of the optical axis thereof by the voice coil 84 and the permanent magnet 87 with the result that the focus of the objective lens 82 is brought accurately or located precisely onto the surface 50 of the object. The focusing operation of the objective lens 82 is performed as described above in accordance with the thickness of the object 42 by the optical head drive mechanism 54 and the objective lens drive mechanism 83, which mechanisms 54 and 83 are actuated in accordance with the focusing signal on the basis of the intensity of the reflected laser beam. After the focusing of the objective lens 82 is performed, the turntable 40 is rotated in the R direction at the prescribed speed and the head support 30 is moved in the X direction at the prescribed speed, and the overall surface 50 to be inspected is helically scanned by the laser beam. The detection signal obtained by this scanning is fed to a defect discriminating unit (not shown), which thus inspects a defect, e.g., a scratch, dust or the like on the surface 50 to be inspected of the object. More particularly, when dust or the like as the defect exists on the surface 50 to be inspected of the object, the laser beam is scattered by the scratch or the dust on the defect area of the surface, and the intensity of the reflected laser beam is thus reduced, thereby detecting the defect. The planar fluctuation of the surface 50 of the object caused by the rotation of the turntable 42 during the scanning operation is corrected by the automatic focusing action of the objective lens drive mechanism 83. Accordingly, according to such preferred embodiment of the present invention, even if the object 42 has different thickness, the distance between the objective lens 82 and the surface 50 of the object approaches to the focal length of the objective lens 82 by the optical head drive mechanism 54, and the focusing of the objective lens 82 can be accurately performed by the objective lens drive mechanism 83. As a consequence, even if the surface of the object 42 such as, the glass original plate for the video disk, the IC wafer having a thickness thinner than the glass original plate, or the like having different thickness is inspected, the focus of the objective lens 82 can be readily brought to or located to the surface 50 of the object 42, thereby enabling the detection of the defect on the surface 50 of the object 42. Since the optical head drive mechanism 54 does not directly move the objective lens 82 along the optical path of the laser beam but moves the optical head 52 in the direction of the optical path, in case that the distance between the objective lens 82 and the surface 50 of the object 42 approaches to the focal length of the objective lens 82 in accordance with the thickness of the object 42, the inclination of the objective lens 82 and hence the tilting of the optical axis caused by the movement of the optical head can be prevented, and the focusing operation of the objective lens 82 can be thus improved. Further, since the lead of the female threads 64 of the middle cylinder 60 is set larger than that of the female threads 58 of the outer cylinder 56 in the optical head drive mechanism 54, the moving distance of the optical head 52 can be, even if the rotating amount of the focus motor 76 is small, increased. In addition, since the optical head 52 is engaged through the inner cylinder 66 with the middle cylinder 60 and the middle cylinder 60 is engaged with the outer cylinder 56 in the support in the optical head drive mechanism 54, the fluctuation of the optical head 52 can be thus prevented. Since the lead of the female threads 58 of the outer cylinder 56 is, furthermore, smaller as such 0.75, the descent of the optical head 52 due to it own weight can also be prevented.

Figure 4:
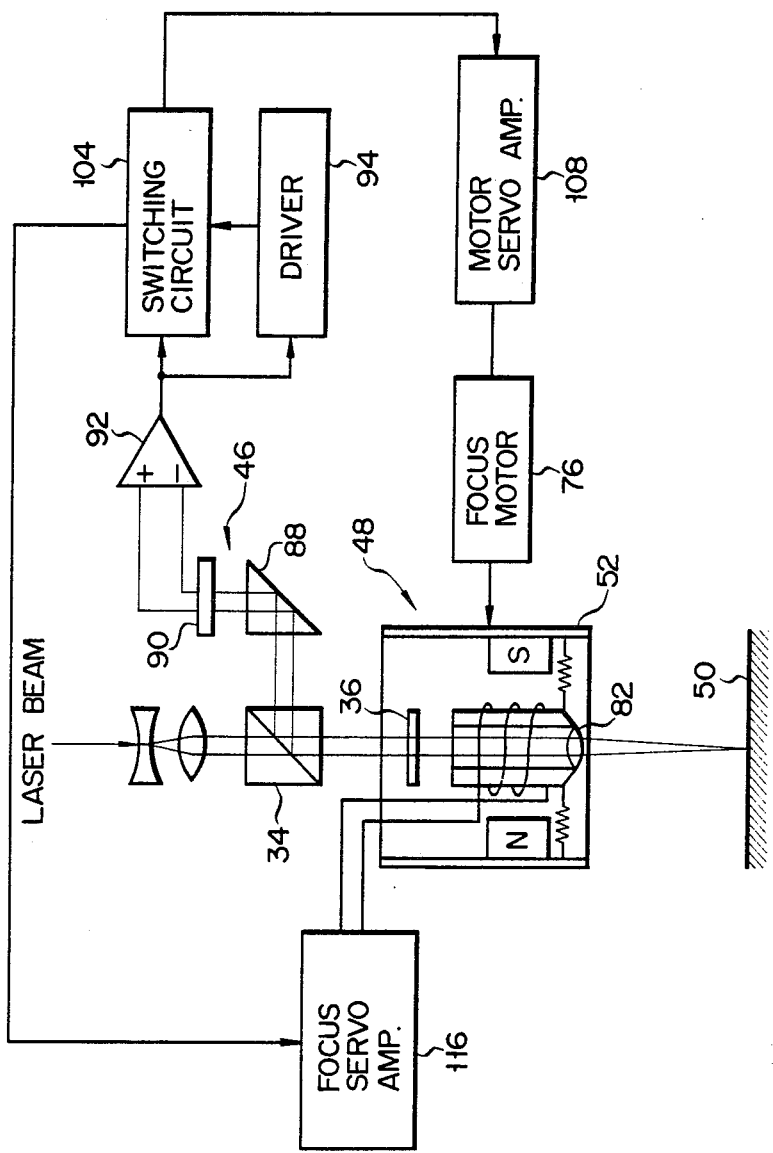
FIG. 4 is a block diagram of the system shown in FIG. 2.
Figure 5:
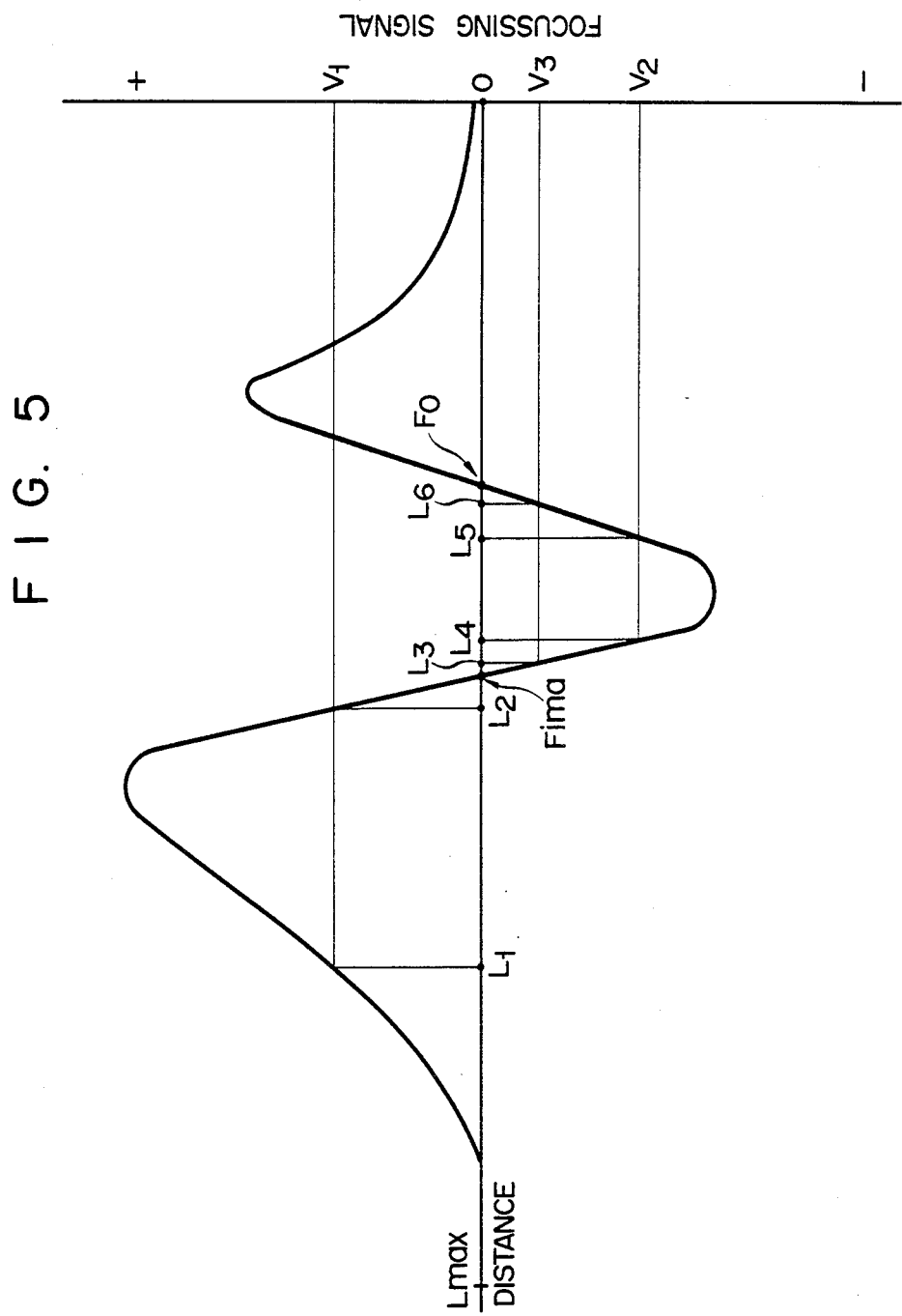
FIG. 5 is a graph showing the relationship between the focusing error signal produced from the comparator shown in FIG. 4 and the distance from the objective lens to the surface of the object.
Figure 6:
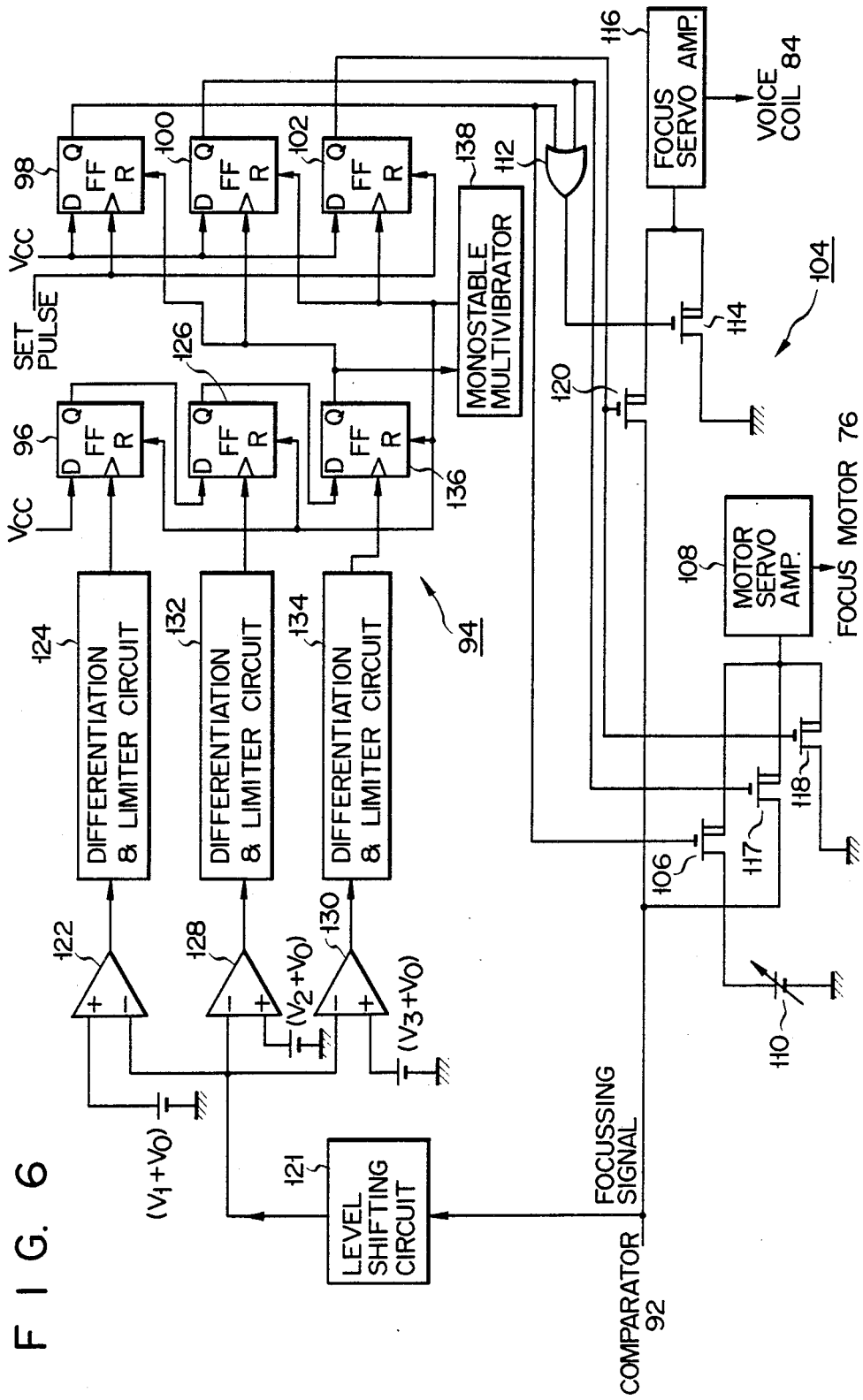
FIG. 6 is a block diagram showing the details of the switching circuit and the driver shown in FIG. 4.

The focusing signal generating unit 51 will be then described in detail with reference to FIGS. 4, 5, 6, 7(A) through 7(O). FIG. 4 is a block diagram of the system shown in FIG. 2, wherein the same reference numerals designate the same or equivalent parts and components shown in FIG. 2 and will be omitted for the convenience of the description. In FIG. 4, the detector unit 46 is composed of a detection prism 88 and a photo detector 90 as disclosed in U.S. Ser. No. 161,428 now abandoned filed in June 20, 1980, by Toru MUSHA. The detector unit 46 may also be composed of a cylindrical lens and a photo detector in combination as disclosed in U.S. Pat. No. 4,079,247 issued on Mar. 14, 1978 by Bricot et al. The photo detector 90 shown in FIG. 4 has two photo detecting regions, which are respectively connected to the input terminals of a comparator 92. When the optical head 52 is moved at the highest position Lmax sufficiently isolated from the surface 50 of the object 42, the output signal and hence the focusing signal from the comparator 92 is maintained substantially at zero level. As the optical head 52 approaches the surface 50 of the object 42, the focusing signal shown in FIG. 5 is generated from the comparator 92. In FIG. 5, the focal point of the objective lens 82 is located on the surface 50 of the object 42 at the point designated by reference character Fo. The focusing signal generating unit 51 serves to actuate the optical head drive unit 48 so that the objective lens 82 is located at the point Fo. However, in case that the optical head drive unit 48 is actuated by the output signal from the comparator 92 solely, it might be judged that the objective lens 82 is located at the point Fo as designated at the point Fima. This is because the output levels from the comparator 92 are equal at the points Fo and Fima. Accordingly, it is judged whether or not the objective lens 82 has passed the point Fima and approaches the point Fo. This will be described below in detail with refeerence to FIGS. 4 and 6. When a focus command is, after the optical head 52 is moved to the highest position Lmax by the focus motor 76, applied from a keyboard (not shown) to the system at the time point t0, the optical head 52 will start to move to the surface 50 of the object 42 by the focus motor 76. That is, high level signal Vcc is applied to the input terminals D of flip-flops 96, 98, 100, 102 of the driver 94 shown in FIG. 6, as shown in FIG. 7(A), at the time point t0, a set pulse is applied respectively to the set terminal of the flip-flop 98 and the reset terminal of the flip-flop 102, as shown in FIG. 7(B), at the time t0, the flip-flop 98 is thus set, and the flip-flop 102 is thus reset. Accordingly, a high level signal is applied from the output terminal Q of the flip-flop 98, as shown in FIG. 7(C), to the FET 106 of the switching circuit 104, the FET 106 is thus turned ON, the focus motor 76 is connected to a power source 110 capable of regulating the supplying power through a motor servo amplifier 108 and the FET 106. Thus, the focus motor 76 is actuated, and the optical head 82 starts descending. Further, a high level signal is applied from the output terminal Q of the flip-flop 98 through an OR gate 112 to an FET 114, a focus servo amplifier 116 is connected to an earth via the FET 114, and the voice coil 84 remains not actuated. Other FETs 117, 118, 120 of the switching circuit 104 are maintained in nonconducted state. As the optical head 52 descends, the focusing signal shown in FIG. 5 is generated from the comparator 92, is then applied to a level shifting circuit 121, the level of which is thus shifted in the level of the voltage V0. The focusing signal thus shifted in the level is applied respectively to the inverting input terminal of the first comparator 122 and the non-inverting input terminal of the second and the third comparators 128 and 130. The voltage (V1+V0) is applied to the non-inverting input terminal of the first comparator 122, and the voltages (V2+V0) and (V3+V0) are respectively applied to the second and the third comparators 128 and 130. Accordingly, when the optical head 52 is downwardly moved to pass the position L1 at the time t1, the level of the focusing signal from the comparator 92 reaches the voltage V1, and the signal shifted in level of the voltage (V1+V0) is applied from the level shifting circuit 121 to the respective comparators 122, 128, 130. Thus, the output of the first comparator 122 is varied from low level to high level at the time t1 as shown in FIG. 7(D). When the optical head 52 is then continuously moved downwardly to pass the position L2 at the time t2, the focusing signal from the comparator 92 is shifted in level lower than the voltage V1. Accordingly, the output of the first comparator 122 is again varied from high level to low level as shown in FIG. 7(D) at the time t2. When the optical head 52 has passed the position L3 at the time t3, the focusing signal from the comparator 92 will decrease its level lower than the voltage V3. Thus, the output from the third comparator 130 is varied from high level to low level as shown in FIG. 7(E). Similarly, when the optical head 52 passes the position L4, the output from the second comparator 128 is varied from high level to low level as shown in FIG. 7(F). When the optical head 52 thus passes the positions L5 and L6, respectively, the outputs from the second and the third comparators 128, 130 are varied from low level to high level as shown in FIGS. 7(E) and 7(F). Thus, the output signals from the first, second and third comparators 122, 128 and 130 shown in FIGS. 7(D), 7(E) and 7(F) are respectively applied to the first, second and third differential and limiter circuits 124, 132 and 134. The first differential and limiter circuit 124 will generate a set pulse as shown in FIG. 7(G) at the leading edge of the signal shown in FIG. 7(D). Thus, a set signal is inputted to the input terminal of the first flip-flop 96 at the location L1 and hence at the time t1, the flip-flop 96 is thus set, a high level signal is generated from the output terminal Q as shown in FIG. 7(H), and is in turn applied to the input terminal D of the second flip-flop 126. The second differential and limiter circuit 132 will generate a set pulse as shown in FIG. 7(I) at the leading edge of the signal shown in FIG. 7(F). Thus, a set signal is inputted to the second flip-flop 126 at the location L4 and hence at the time t4 and a high level signal shown in FIG. 7(I) is applied to the input terminal D of the third flip-flop 136 via the output terminal Q thereof. Further, the third differential and limiter circuit 134 will generate a set pulse as shown in FIG. 7(K) at the leading edge of the signal shown in FIG. 7(E). Thus, a set pulse is inputted to the third flip-flop 136 at the location L6 and hence at the time t6, and a high level signal shown in FIG. 7(L) is generated from the output terminal Q thereof. This high level signal is respectively applied to the input terminal of a monostable multivibrator 138, the reset terminal R of the flip-flop 98 and the input terminal of the flip-flop 100 at the time t6. Accordingly, the monostable multivibrator 138 will operate from the time t6 during a preset time T0, the flip-flop 98 is reset, the flip-flop 100 is set, the output terminal of the flip-flop 98 is varied from high level to low level as shown in FIG. 7(C), and the output terminal of the flip-flop 100 becomes high level as shown in FIG. 7(M). Consequently, the FET 106 is turned OFF, the FET 117 is turned ON, the motor servo amplifier 108 is connected to the comparator 92, and the focusing error signal is applied to the motor servo amplifier 108. At the time t6 the FET 114 is maintained in a conducting state by the flip-flop 100, and the focus servo amplifier 116 is grounded to the earth. The motor servo amplifier 108 serves to amplify the focusing signal and to apply it to the focus motor 76. Accordingly, the optical head 52 is lowered to the vicinity of the focal position Fo and passes temporarily through the focal position Fo. When the optical head 52 has passed through the focal position Fo, the focusing signal is varied from negative to positive level as shown in FIG. 5. Thus, the optical head 52 is raised toward the focal position Fo. When the optical head 52 thus repetitively descends and ascends slightly from the time t6 and after a prescribed period, the optical head 52 will stop moving, resulting in that the objective lens 82 is located at the focal point Fo.

At the time t7 after the preset time T0 from the time t6, an output pulse from the monostable multivibrator 138 as shown in FIG. 7(N) is lowered. The flip-flops 96, 126, 136 are thus reset, the flip-flop 100 is reset, and the flip-flop 102 is set at the tail end of the output pulse from the monostable multivibrator 138. Accordingly, the FET 117 is turned OFF, the FET 118 is turned ON with the high level signal shown in FIG. 7(O) applied from the output terminal Q of the flip-flop 102. Thus, the motor servo amplifier 108 is grounded through the FET 118 to the earth. Then, the FET 114 is turned OFF, the FET 120 is turned ON with the signal shown in FIG. 7(O), the focus servo amplifier 116 is connected through the FET 120 to the comparator 92, and the focusing signal is applied to the focus servo amplifier 116. The voice coil 84 is actuated by the focusing signal thus amplified by the focus servo amplifier 116, is so adjusted that the objective lens 82 is always located at the focal point on the surface 50 to be inspected of the object, and even if the surface 50 of the object is infinitesimally moved in a vertical direction, the focal point is always located on the surface 50 of the object.

Figure 8:
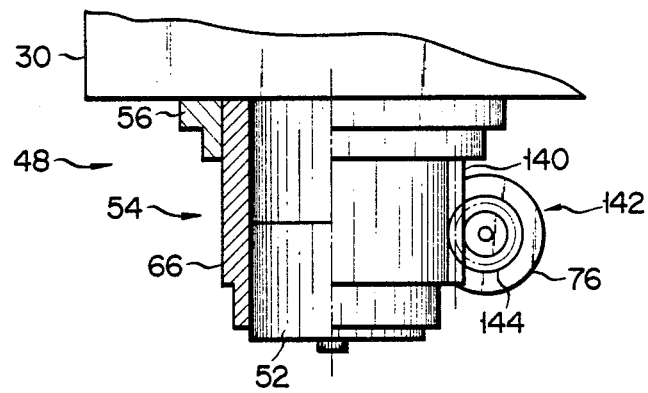
FIG. 8 is a sectional view showing another example of the optical head drive unit in FIG. 3.

Another preferred embodiment of the system of the present invention will be further described with reference to FIG. 8. In FIG. 8, the same reference numerals as those shown in FIG. 3 will be omitted for the convenience of the description with the same reference numerals designated.

In FIG. 8, the outer cylinder 56 is mounted on the head support 30. The inner cylinder 66 is engaged within the inside of the outer cylinder 56, and is supported movably along the optical path of the laser beam in the outer cylinder 30. The optical head 52 is engaged within the inner cylinder 66, and is located on the optical path of the laser beam and is supported in the inner cylinder. A rack 140 is provided on the outer surface of the inner cylinder 66, and is connected to a drive unit 142. The drive unit 142 is composed of a rack 140 and a pinion 144 engaged with the rack 140, and a focus motor 76. When the focus motor 76 of the drive unit 142 is energized, it will move the inner cylinder 66 and hence the optical head 52 via the pinion 144 and the rack 140 along the direction of the optical axis of the optical head and hence the optical path of the laser beam. The focus motor 76 is actuated by the focusing signal. Accordingly, according to this preferred embodiment of the system of the present invention, the middle cylinder 60 can be omitted as compared with the previous first embodiment shown in FIG. 3, and since the optical head 52 can be moved via the rack 140 and the pinion 144, the structure can be simplified. Consequently, the manufacture of the system according to this preferred embodiment of the present invention can be facilitated and the overall system can be reduced in size.

The present invention is not limited only to the particular embodiment described above. Various other changes and modification may be made within the spirit and scope of the present invention. For example, the optical head employed in the system of the present invention with the drive unit may not always be applied only to the system for inspecting a defect on the surface to be inspected of the object, but may also be applied to an optical video disk system for recording and reading the data on the video disk via the laser beam.

In the above description, only the switching circuit 104 and the driver 94 for applying the detector unit 46 described in U.S. Ser. No. 161,428 now abandoned is described as a preferred embodiment, but the switching circuit 104 and the driver 94 for applying the detector unit 46 described U.S. Pat. No. 4,079,247 may be easily made from the above description.

As described above, according to the present invention, since the system of the present invention has the optical head drive mechanism for moving the laser beam reflected from the surface to be inspected of the object along the optical path of the laser beam in response to the thickness of the object with the optical head in accordance with the focusing signal, even if the object has different thickness, the focusing of the objective lens can be automatically performed at the optical head by the optical head drive mechanism. Further, since the optical head drive mechanism does not move directly the objective lens but moves the entire optical head, the inclination of the objective lens can be prevented and the focusing of the objective lens can be accurately carried out.

What we claim is:

1. A system for focusing an optical head onto a substantially flat surface of an object, comprising:
    a unit for generating a laser beam;
    an optical head for receiving the laser beam and for projecting said laser beam onto the surface of the object, said optical head including an objective lens having an optical axis and a focal point for converging the laser beam toward the focal point; and means for directing the laser beam reflected from the surface of the object in a predetermined direction;
    first moving means coupled to the optical head for moving said optical head along the optical axis of the objective lens of said optical head;
    second moving means coupled to the objective lens for moving the objective lens along the optical axis of the objective lens of said optical head;
    means for detecting the reflected laser beam directed by said directing means and for generating a focusing signal having a level corresponding to the distance between the objective lens and the surface of the object;
    first energizing means for selectively energizing said first moving means for moving said optical head in response to the level of the focusing signal; and
    second energizing means for selectively energizing said second moving means for moving said objective lens in response to the level of the focusing signal;
    only one of said first and second energizing means energizing its respective first and second moving means at any one time.

2. A system according to claim 1, wherein said system further comprises means for selecting one of the first and second energizing means in accordance with the level of the focusing signal to couple the detecting means to the selected energizing means.

3. A system according to claim 2, wherein said selecting means includes means for connecting the first energizing means to the detecting means when the focusing signal reaches a predetermined level, and for disconnecting the first energizing means from the detecting means and for connecting the second energizing means to the detecting means after a predetermined time from the time of connecting the first energizing means to the detecting means. the first and second energizing means in accordance with the level of the focusing signal to couple the detecting means to the selected energizing means.

4. A system according to claim 1, wherein said system further comprises means for supporting said optical head.

5. A system according to claim 4, wherein said first moving means for moving the optical head includes:
    an outer cylinder formed with female threads having a lead on the inner surface and secured to said supporting means;
    a middle cylinder formed with female threads having larger lead than that of the outer cylinder on the inner surface and having male threads engaged with the female threads of the outer cylinder on the outer surface;
    an inner cylinder having male threads engaged with the female threads of the middle cylinder on the outer surface and a guide slot formed along the axis thereof for supporting said optical head;
    a stopper for preventing the rotation of the inner cylinder, enabling the axial movement of the optical head of the inner cylinder, engaged with the guide slot and secured to the outer cylinder; and
    means for rotating the middle cylinder.

6. A system according to claim 4, wherein said first moving means for moving the optical head includes:
    an outer cylinder secured to said supporting means;
    an inner cylinder elevationally movably engaged with the outer cylinder and having a rack provided on the outer surface thereof for supporting the optical head; and
    means having a pinion engaged with the rack for rotating the pinion.

7. A system according to claim 1, wherein said optical head includes means for supporting axially movably the objective lens therein, and said second moving means for moving the objective lens along the optical axis of the lens includes a permanent magnet secured to the objective lens and a voice coil for moving the permanent magnet in the direction of the optical axis of the objective lens.

8. A system according to claim 2, wherein said selecting means includes means for connecting the first energizing means to the detecting means when the focusing signal reaches a predetermined level, and for disconnecting the first energizing means from the detecting means and for connecting the second energizing means to the detecting means responsive to the focusing signal reaching a different predetermined level.

9. A system according to claim 1, wherein said first moving means is energized first to produce a coarse focus adjustment, and said second moving means is thereafter energized to produce a fine focus adjustment.

* * * * *

UNITED STATES PATENT AND TRADEMARK OFFICE
CERTIFICATE OF CORRECTION

PATENT NO. : 4,495,407
DATED : January 22, 1985
INVENTOR(S) : KODAMA et al

It is certified that error appears in the above-identified patent and that said Letters Patent is hereby corrected as shown below:

Col. 4, lines 58-59, after "when" and before "dust", insert --the scratch,--;

Col. 9, last line, delete "the first and second energizing means",

Col. 10, delete lines 1-3.

Signed and Sealed this

Twentieth Day of August 1985

[SEAL]

Attest:

DONALD J. QUIGG

Attesting Officer     Acting Commissioner of Patents and Trademarks